United States Patent [19]

Iwasaki

[11] Patent Number: 5,513,222

[45] Date of Patent: Apr. 30, 1996

[54] COMBINING CIRCUIT FOR A DIVERSITY RECEIVING SYSTEM

[75] Inventor: Motoya Iwasaki, Tokyo, Japan

[73] Assignee: NEC Corporation, Tokyo, Japan

[21] Appl. No.: 363,940

[22] Filed: Dec. 27, 1994

[30] Foreign Application Priority Data

Dec. 28, 1993 [JP] Japan .................. 5-334266

[51] Int. Cl.$^6$ .............................. H04B 7/10; H04B 17/02
[52] U.S. Cl. .................. 375/347; 455/137; 455/138
[58] Field of Search .................. 375/347, 345; 455/132, 137, 138, 139, 273

[56] References Cited

U.S. PATENT DOCUMENTS

| | | | |
|---|---|---|---|
| 3,902,119 | 8/1975 | Skingley | 455/138 |
| 4,079,318 | 3/1978 | Kinoshita | 455/273 |
| 5,263,180 | 11/1993 | Hirayama et al. | 455/139 |

FOREIGN PATENT DOCUMENTS

| | | |
|---|---|---|
| 55-27752 | 2/1980 | Japan . |
| 56-157139 | 12/1981 | Japan . |

OTHER PUBLICATIONS

Tomohiro Dohi et al., "Performance of the Unique–Word–Reverse–Modulation Type Demodulator for Mobile Satellite Communications", IMSC, 1993, pp. 455–460.

Primary Examiner—Stephen Chin
Assistant Examiner—T. Ghebretinsae
Attorney, Agent, or Firm—Sughrue, Mion, Zinn, Macpeak & Seas

[57] ABSTRACT

In a combining circuit comprising first and second frequency converting sections (20a, 20b) for frequency converting first and second received signals from two independent antennas (10a, 10b) under the control of a control circuit (30) into first and second frequency-converted signals, first and second preliminary amplifying sections (60a, 60b) preliminarily amplify the first and the second frequency-converted signals under the control of the control circuit (30) to produce first and second preliminary amplified signals having first and second output levels, respectively. The first and the second preliminary amplified signals have first and second noise power levels, respectively, which are equal to each other. First and second main amplifying sections (40a, 40b) mainly amplify the first and the second preliminary amplified signals by first and second amplification degrees in proportional to the first and the second output levels, respectively. The first and the second main amplifying sections produce first and second main amplified signals having first and second phases, respectively. A signal combining section (50) combines the first main amplified signal with the second main amplified signal with the first phase shifted into the second phase. The signal combining section produce a combined signal.

5 Claims, 2 Drawing Sheets

COMBINING CIRCUIT FOR A DIVERSITY RECEIVING SYSTEM

BACKGROUND OF THE INVENTION

This invention relates to a combining circuit for use in a diversity receiving system.

A combining circuit combines first and second received signals from two independent antennas to produce a combined signal. Various combining circuits of the type are already known. By way of example, a combining circuit is disclosed in Japanese Unexamined Patent Prepublication No. 27752/80, by Nobuo Katayamao. In the combining circuit disclosed by Katayama, first and second output signals given from two independent receivers are applied to first and second variable gain amplifiers. The first and the second variable gain amplifiers produce first and second amplified outputs signals which are added together at an adder. The adder produces an added output signal which is drawn out from an output terminal via an automatic gain control circuit. A serial circuit consisting of a first amplifier, an inversional circuit, and a second amplifier is installed between the first and the second variable gain amplifiers. First and second control voltages sent from the two independent receivers are applied to a subtractor circuit for subtraction. The subtractor circuit has an output which is connected to the joint of the first amplifier and the inversional circuit forming the serial circuit. As a result, the linear relation is available for the gain to the gain control voltage of the first and the second variable gain amplifiers, thus obtaining the optimum compound ratio over a wide range with no special property required.

Another combining circuit is disclosed in Japanese Unexamined Patent Prepublication No. 157139/81, by Atsushi Muromoto. In the combining circuit disclosed by Muromoto, first and second receivers demodulate first and second received signals from two antennas into first and second baseband signals, respectively. Connected to the first and the second receivers, first and second control voltage generators generate first and second control voltages according to the signal-to-noise ratio of the first and the second received signals, respectively. The first and the second control voltages are supplied to an auxiliary circuit which comprises a maximum control voltage generator, a reference voltage comparator, and first and second differential amplifiers. The maximum control voltage generator extracts the maximum control voltage from the first and second control voltages and provides it to the reference voltage comparator. The reference voltage comparator produces a difference voltage between the maximum control voltage and a reference voltage. The difference voltage is applied to an input of each of the first and the second differential amplifiers that amplify each diversity route. The first and the second control voltages are applied to another inputs of the first and the second differential amplifiers, respectively. The first differential amplifier produces a first differential voltage between the first control voltage and the difference voltage while the second differential amplifier produces a second differential voltage between the second control voltage and the difference voltage. The first and the second baseband signals are supplied to first and second specific square attenuators which are controlled by the first and the second differential voltages, respectively.

Still another combining circuit is disclosed in an article which is contributed by Tomohiro Dohi et al to IMSC (1993), pages 455–460, and which has a title of "Performance of the Unique-Word-Reverse-Modulation Type Demodulator for Mobile Satellite Communications." The combining circuit disclosed by Dohi et al, comprises two RF/IF circuits and a pre-detection signal combiner. Signal sequences are received by two antennas and converted into baseband analog signal sequences by quadrature detection in the two RF/IF circuits each of which consists of a frequency converter, a band pass filter (BPF), and an automatic gain control (AGC) amplifier. In the signal combiner, each analog signal sequence is converted into a 12 bit digital signal sequence with identical timing. Each branch's signal sequence is combined to improved the received bit energy-to-noise power density ratio ($E_b/N_0$).

At any rate, as will later be described in conjunction with FIG. 1, a conventional combining circuit comprises first and second frequency converting sections, first and second main amplifying sections, and a signal combining section. The first and the second frequency converting sections are supplied with first and second received signals from two independent antennas, respectively. The first and the second frequency converting sections frequency convert the first and the second received signals into first and second frequency-converted signals having first and second output levels, respectively. Connected to the first and the second frequency converting sections, respectively, the first and the second main amplifying sections mainly amplify the first and the second frequency-converted signals by first and second amplification degrees in proportion to the first and the second output levels, respectively. The first and the second main amplifying sections produce first and second main amplified signals having first and second phases, respectively. Connected to the first and the second main amplifying sections, the signal combining section combines the first main amplified signal with the second main amplified signal with the first phase shifted into the second shift. The signal combining section produces a combined signal. The combined signal is supplied to a demodulator.

In general, the first and the second frequency converting sections have first and second converting gains which are different from each other. Under the circumstances, the first and the second frequency-converted signals have first and second noise power levels, respectively, which are different from each other. As a result, the conventional combining circuit is disadvantageous in that it is impossible to obtain the first and the second amplification degrees for the first and the second main amplifying sections having an optimal combining ratio therebetween.

SUMMARY OF THE INVENTION

It is therefore an object of this invention to provide a combining circuit which is capable of obtaining amplification degrees for main amplifying sections having an optimal combining ratio therebetween.

It is another object of this invention to provide a combining circuit of the type described, which is capable of equalizing both noise power levels in signals with which the main amplifying sections are supplied.

Other objects of this invention will become clear as the description proceeds.

On describing the gist of an aspect of this invention, it is possible to be understood that a combining circuit for use in a diversity receiving system is for combining first and second received signals from first and second antennas to produce a combined signal.

According to this invention, the above-understood combining circuit comprises first and second frequency converting sections, supplied with the first and the second received signals, respectively, for frequency converting the first and the second received signals into first and second frequency-converted signals, respectively. Connected to the first and the second frequency converting sections, a control circuit is for controlling a channel of the first and the second frequency converting sections. Connected to the control circuit and to the first and the second frequency converting sections, respectively, first and second preliminary amplifying sections are for preliminarily amplifying the first and the second frequency-converted signals to produce first and second preliminary amplified signals which have first and second output levels, respectively. The first and the second preliminary amplified signals have first and second noise power levels, respectively, which are equal to each other. Connected to the first and the second preliminary amplifying sections, respectively, first and second main amplifying sections are for mainly amplifying the first and the second preliminary amplified signals by first and second amplification degrees in proportion to the first and the second output levels, respectively. The first and the second main amplifying sections produce first and second main amplified signals having first and second phases, respectively. Connected to the first and the second main amplifying sections, a signal combining section is for combining the first main amplified signal with the second main amplified signal with the first phase shifted into the second phase. The signal combining section produces the combined signal.

DESCRIPTION OF THE PREFERRED EMBODIMENT

Figure 1:
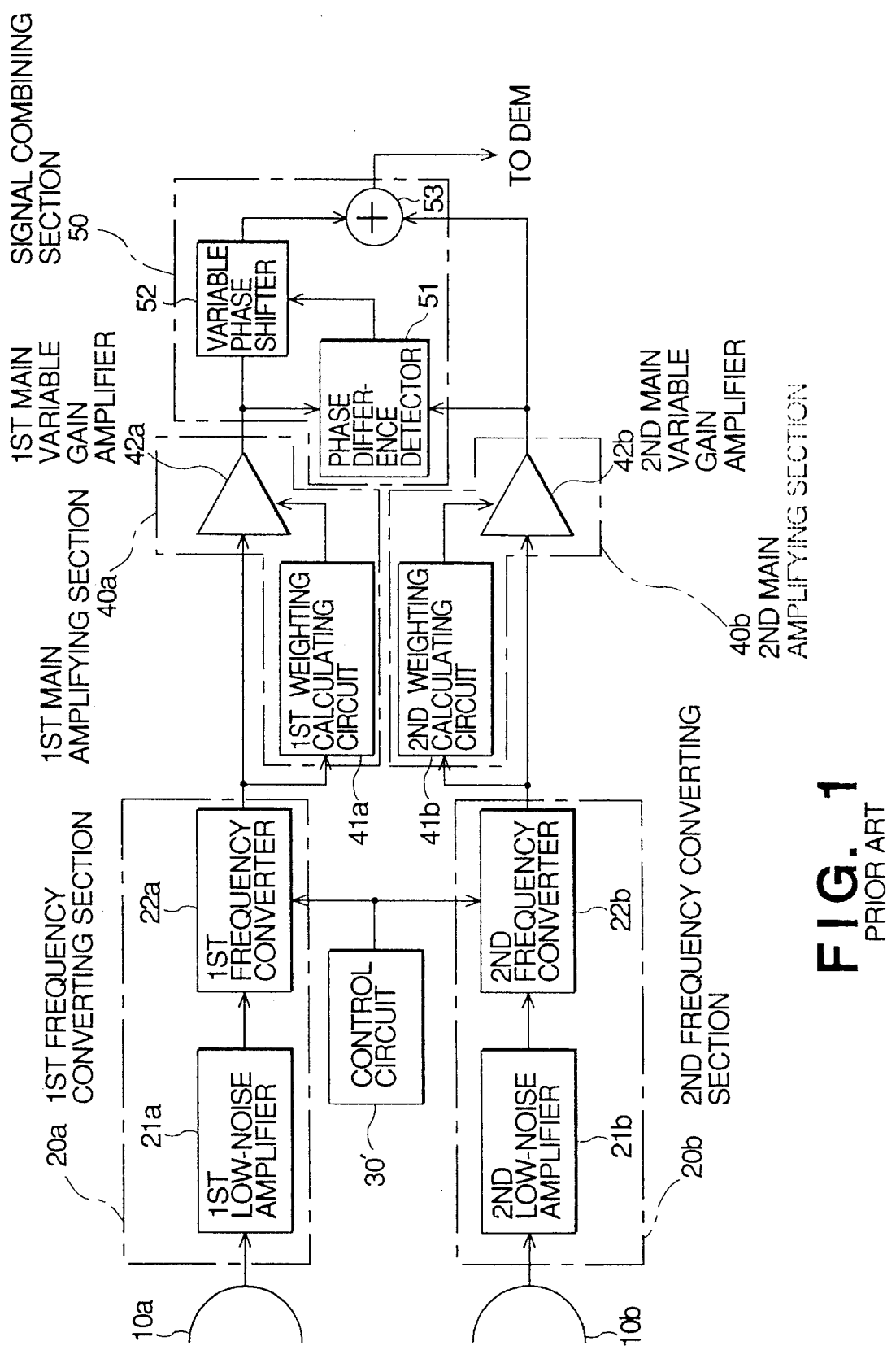
FIG. 1 is a block diagram of a conventional combining circuit.

Referring to FIG. 1, a conventional combining circuit will first be described in order to facilitate an understanding of the present invention. The combining circuit is for use in a diversity receiving system. The combining circuit combines first and second received signals from first and second antennas $10a$ and $10b$ to produce a combined signal. Each of the first and the second received signals has a radio frequency.

The combining circuit comprises first and second frequency converting sections $20a$ and $20b$, a control circuit $30'$, first and second main amplifying sections $40a$ and $40b$, and a signal combining section $50$.

The first and the second frequency converting sections $20a$ and $20b$ are supplied with the first and the second received signals from the first and the second antennas $10a$ and $10b$, respectively. The first and the second frequency converting sections $20a$ and $20b$ frequency convert the first and the second received signals into first and second frequency-converted signals, respectively. The control circuit $30'$ controls a channel of the first and the second frequency converting sections $20a$ and $20b$.

More specifically, the first frequency converting section $20a$ comprises a first low-noise amplifier $21a$ and a first frequency converter $22a$. The first low-noise amplifier $21a$ is supplied with the first received signal. The first low-noise amplifier $21a$ amplifies the first received signal to produce a first low-noise amplified signal. The first low-noise amplified signal is supplied to the first frequency converter $22a$.

The first frequency converter $22a$ frequency converts the first low-noise amplified signal into the first frequency-converted signal with the channel controlled by the control circuit $30'$.

Likewise, the second frequency converting section $20b$ comprises a second low-noise amplifier $21b$ and a second frequency converter $22b$. The second low-noise amplifier $21b$ is supplied with the second received signal. The second low-noise amplifier $21b$ amplifies the second received signal to produce a second low-noise amplified signal. The second low-noise amplified signal is supplied to the second frequency converter $22b$. The second frequency converter $22b$ frequency converts the second low-noise amplified signal into the second frequency-converted signal with the channel controlled by the control circuit $30'$.

In the example being illustrated, each of the first and the second frequency-converted signals has an intermediate frequency. The first and the second frequency-converted signals have first and second output levels, respectively.

The first and the second main amplifying sections $40a$ and $40b$ are connected to the first and the second frequency converting sections $20a$ and $20b$, respectively. The first and the second main amplifying sections $40a$ and $40b$ mainly amplify the first and the second frequency-converted signals by first and second amplification degrees in proportion to the first and the second output levels, respectively. The first and the second main amplifying sections $40a$ and $40b$ produce first and second main amplified signals having first and second phases, respectively.

More particularly, the first main amplifying section $40a$ comprises a first weighting calculating circuit $41a$ and a first main variable gain amplifier $42a$. The first weighting calculating circuit $41a$ is supplied with the first frequency-converted signal. The first weighting calculating circuit $41a$ calculates a first weighting factor on the basis of the first output level of the first frequency-converted signal. The first weighting calculating circuit $41a$ produces a first weighting output voltage indicative of the first weighting factor. The first weighting output voltage is supplied to the first main variable gain amplifier $42a$. The first main variable gain amplifier $42a$ is supplied with the first frequency-converted signal. The first main variable gain amplifier $42a$ has a first main variable gain which is controlled by the first weighting output voltage and which corresponds to the first amplification degree. The first main variable gain amplifier $42a$ amplifies the first frequency-converted signal by the first main variable gain to produce the first main amplified signal.

Similarly, the second main amplifying section $40b$ comprises a second weighting calculating circuit $41b$ and a second main variable gain amplifier $42b$. The second weighting calculating circuit $41b$ is supplied with the second frequency-converted signal. The second weighting calculating circuit $41b$ calculates a second weighting factor on the basis of the second output level of the second frequency-converted signal. The second weighting calculating circuit $41b$ produces a second weighting output voltage indicative of the second weighting factor. The second weighting output voltage is supplied to the second main variable gain amplifier $42b$. The second main variable gain amplifier $42b$ is supplied with the second frequency-converted signal. The second main variable gain amplifier $42b$ has a second main variable gain which is controlled by the second weighting output voltage and which corresponds to the second amplification degree. The second main variable gain amplifier $42b$ amplifies the second frequency-converted signal by the second main variable gain to produce the second main amplified signal.

Each of the first and the second weighting calculating circuits 41a and 41b may comprise a detecting circuit and an amplifier. This is because the first and the second weighting calculating circuits 41a and 41b generate the first and the second weighting output voltages in proportional to the first and the second output levels of the first and the second frequency-converted signals, respectively.

The signal combining section 50 is connected to the first and the second main amplifying sections 40a and 40b. The signal combining section 50 combines the first main amplified signal with the second main amplified signal with the first phase shifted into the second phase. The signal combining section 50 produces the combined signal.

More specifically, the signal combining section 50 comprises a phase difference detector 51, a variable phase shifter 52, and an adder 53. The phase difference detector 51 is supplied with the first and the second main amplified signals. The phase difference detector 51 detects a phase difference between the first phase of the first main amplified signal and the second phase of the second amplified signal. The phase difference detector 51 produces a phase difference signal indicative of the phase difference. The phase difference signal is supplied to the variable phase shifter 52. The variable phase shifter 52 is supplied with the first main amplified signal. The variable phase shifter 52 phase shifts, in response to the phase difference signal, the first main amplified signal having the first phase into the phase-shifted signal having the second phase. The phase-shifted signal is supplied to the adder 53. The adder 53 is supplied with the second main amplified signal. The adder 53 adds the phase-shifted signal and the second main amplified signal to produce an addition result signal as the combined signal. The combined signal is supplied to a demodulator (not shown).

In general, the first and the second frequency converting sections 20a and 20b have first and second converting gains which are different from each other. Under the circumstances, the first and the second frequency-converted signals have first and second noise power levels, respectively, which are different from each other. As a result, the conventional combining circuit is disadvantageous in that it is impossible for the first and the second weighting calculating circuits 41a and 41b to calculate the first and the second weighting factors having an optimal combining ratio therebetween.

Figure 2:
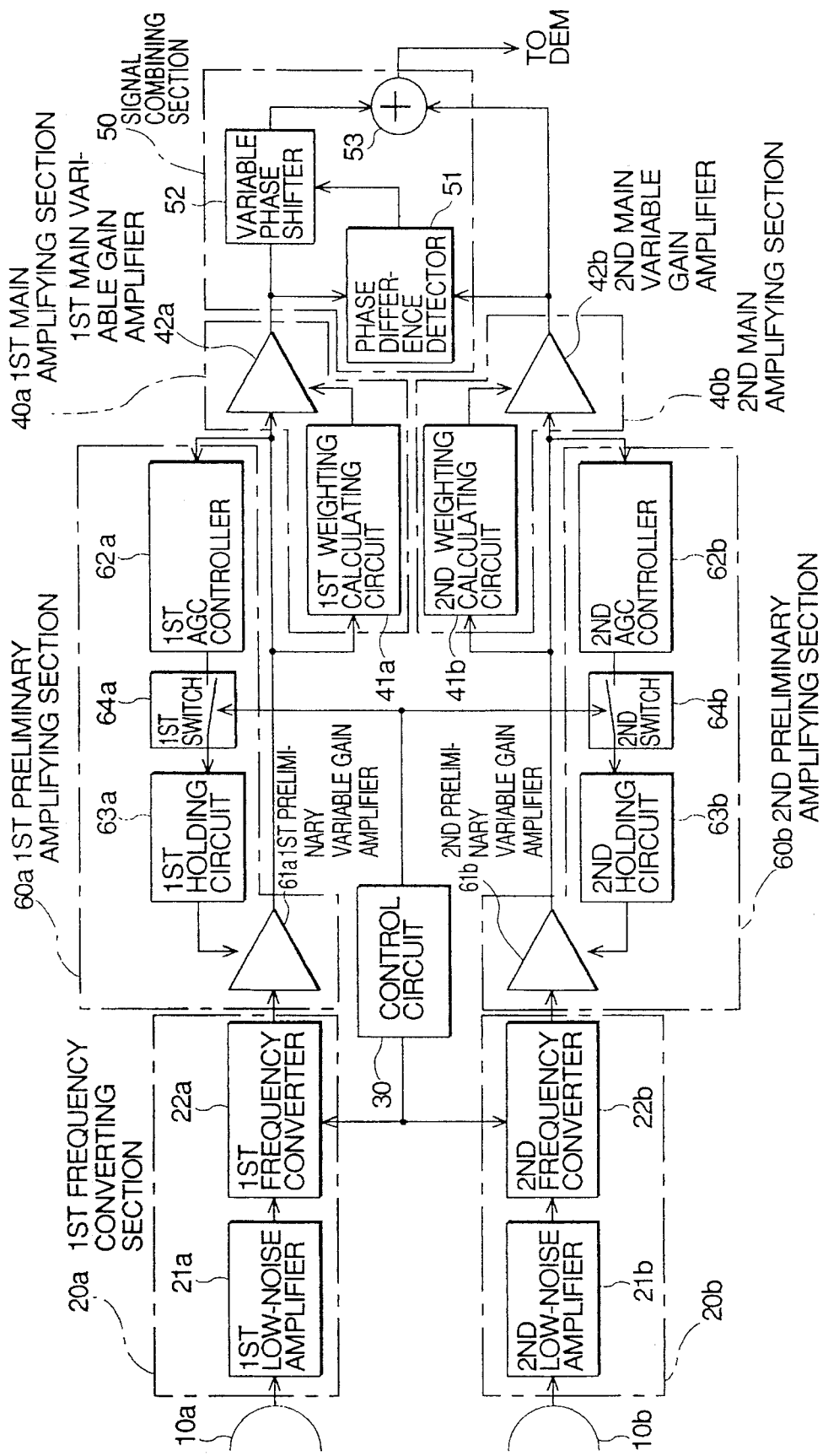
FIG. 2 is a block diagram of a combining circuit according to a preferred embodiment of this invention.

Referring to FIG. 2, the description will proceed to a combining circuit according to a preferred embodiment of this invention. The illustrated combining circuit is similar in structure to that illustrated in FIG. 1 except that the combining circuit comprises first and second preliminary amplifying sections 60a and 60b and the control circuit is modified to be different from that described in conjunction with FIG. 1 as will later become clear. The control circuit is therefore depicted as 30.

The control circuit 30 controls the first and the second frequency converting sections 20a and 20b and the first and the second preliminary amplifying sections 60a and 60b in the manner which will later become clear.

The first preliminary amplifying section 60a is connected between the first frequency converting section 20a and the first main amplifying section 40a. Likewise, the second preliminary amplifying section 60b is connected between the second frequency converting section 20b and the second main amplifying section 40b. The first and the second preliminary amplifying sections 60a and 60b preliminarily amplify the first and the second frequency-converted signals to produce first and second preliminary amplified signals having first and second output levels, respectively. The first and the second preliminary amplified signals have first and second noise power levels, respectively, which are equal to each other.

More specifically, the first preliminary amplifying section 60a comprises a first preliminary variable gain amplifier 61a, a first automatic gain control (AGC) controller 62a, a first holding circuit 63a, and a first switch 64a. The first preliminary variable gain amplifier 61a is connected to the first frequency converting section 20a. The first preliminary variable gain amplifier 61a preliminarily amplifies the first frequency-converted signal by a first preliminary variable gain to produce the first preliminary amplified signal.

The first AGC controller 62a is connected to the first preliminary variable gain amplifier 61a. The first AGC controller 62a produces a first AGC voltage in accordance with the first output level of the first frequency-converted signal so as to maintain the first output level at a predetermined level. The first holding circuit 63a is connected to the first preliminary variable gain amplifier 61a and supplied with a first input voltage. The first holding circuit 63a holds the first input voltage as a first held voltage. The first holding circuit 63a supplies the first held voltage to the first preliminary variable gain amplifier 61a to control the first preliminary variable gain. The first switch 64a is connected between the first AGC controller 62a and the first holding circuit 63a. The first switch 64a is put into an on-state or off-state under the control of the control circuit 30 in the manner which will later become clear. The first switch 63a switches the first AGC voltage to produce the first input voltage.

Similarly, the second preliminary amplifying section 60b comprises a second preliminary variable gain amplifier 61b, a second automatic gain control (AGC) controller 62b, a second holding circuit 63b, and a second switch 64b. The second preliminary variable gain amplifier 61b is connected to the second frequency converting section 20b. The second preliminary variable gain amplifier 61b preliminarily amplifies the second frequency-converted signal by a second preliminary variable gain to produce the second preliminary amplified signal.

The second AGC controller 62b is connected to the second preliminary variable gain amplifier 61b. The second AGC controller 62b produces a second AGC voltage in accordance with the second output level of the second frequency-converted signal so as to maintain the second output level at the predetermined level. The second holding circuit 63b is connected to the second preliminary variable gain amplifier 61b and supplied with a second input voltage. The second holding circuit 63b holds the second input voltage as a second held voltage. The second holding circuit 63b supplies the second held voltage to the second preliminary variable gain amplifier 61b to control the second preliminary variable gain. The second switch 64b is connected between the second AGC controller 62b and the second holding circuit 63b. The second switch 64b is put into the on-state or the off-state under the control of the control circuit 30 in the manner which will later become clear. The second switch 63b switches the second AGC voltage to produce the second input voltage.

The description will be made as regards operation of the combining circuit illustrated in FIG. 2. When a power supply is turned on, the control circuit 30 controls the first and the second frequency converting sections 20a and 20b with a disable condition where the first and the second received signals are not received but noise are received alone (i.e., noise-only signals). In addition, the control circuit 30 controls the first and the second switches 64a and 64b with the on-state. Therefore, the first and the second AGC voltages are supplied as the first and the second input voltages to the first and the second holding circuits 63a and 63b via the first and the second switches 64a and 64b, respectively. Inasmuch as each of the first and the second frequency converting sections 20a and 20b is put into no signal output state, the first and the second frequency converting sections 20a and 20b produce, as the first and the second frequency-converted signals, thermal noises alone which the first and the second antennas 10a and 10b and the first and the second low-noise amplifiers 21a and 21b generate. When the first and the second switches 64a and 64b are turned on, a first AGC feedback loop for the first preliminary variable gain amplifier 61a and a second AGC feedback loop for the second preliminary variable gain amplifier 61b are constructed. As a result, automatic gain controls are carried out so that the first and the second preliminary variable gain amplifiers 61a and 61b produce the first and the second preliminary amplified signals having the first and the second noise power levels which are equal to each other.

After the power supply is turned on, namely, when the first noise power level is equal to the second noise power level, the control circuit 30 controls the first and the second switches 64a and 64b with the off-state. Accordingly, the first and the second holding circuits 63a and 63b hold, as the first and the second held voltages, the first and the second AGC voltages which the first and the second AGC controllers 62a and 62b produce immediately before the first and the second switches 64a and 64b are put into the off-state. As a result, the first and the second preliminary variable gain amplifiers 61a and 61b have the first and the second preliminary variable gains each of which is a constant value, and thereafter the first and the second preliminary variable gain amplifiers 61a and 61b produce the first and the second preliminary amplified signals including first and second thermal noise components whose powers are always equal to each other.

Subsequently, the control circuit 30 controls the first and the second frequency converting sections 20a and 20b with an enable condition where the first and the second received signals are received. As described above, the first and the second preliminary variable gain amplifiers 61a and 61b produce the first and the second preliminary amplified signals including the first and the second thermal noise components whose powers are always equal to each other. The first and the second preliminary amplified signals are supplied to the first and the second main amplifying sections 40a and 40b, respectively. In the first main amplifying section 40a, the first weighting calculating circuit 41a produces the first weighting output voltage which controls the first main variable gain of the first main variable gain amplifier 42a that is proportinal to the first output level of the first preliminary amplified signal. Similarly, in the second main amplifying section 40b, the second weighting calculating circuit 41b produces the second weighting output voltage which controls the second main variable gain of the second main variable gain amplifier 42b that is proportional to the second output level of the second preliminary amplified signal. As a result, the first and the second weighting calculating circuits 41a and 41b calculate the first and the second weighting factors having the optimal combining ratio therebetween.

While this invention has thus far been described in conjunction with the preferred embodiment thereof, it will now be readily possible for those skilled in the art to put this invention into practice in various other manners.

What is claimed is:

1. A method of combining two diversity received signals into a combined signal, the method comprising the steps of:

carrying out automatic gain control (AGC) on the two diversity received signals which are noise-only signals to produce first and second AGC output levels;

calculating two preliminary gains of two preliminary amplifiers when both of said first and second AGC output levels coincide with each other;

determining two main gains of two variable amplifiers on the basis of a ratio of two output levels of the two preliminary amplifiers; and combining two output signals from the two variable amplifiers into the combined signal.

2. A combining circuit for use in a diversity receiving system, said combining circuit being for combining first and second received signals from first and second antennas to produce a combined signal, said combining circuit comprising:

first and second frequency converting sections, supplied with the first and the second received signals, respectively, for frequency converting the first and the second received signals into first and second frequency-converted signals, respectively;

a control circuit, connected to said first and said second frequency converting sections, for controlling a channel of said first and said second frequency converting sections;

first and second preliminary amplifying sections, connected to said control circuit and to said first and said second frequency converting sections, respectively, for preliminarily amplifying the first and the second frequency-converted signals to produce first and second preliminary amplified signals which have first and second output levels, respectively, the first and the second preliminary amplified signals having first and second noise power levels, respectively, which are equal to each other;

first and second main amplifying sections, connected to said first and said second preliminary amplifying sections, respectively, for mainly amplifying the first and the second preliminary amplified signals by first and second amplification degrees in proportional to the first and the second output levels, respectively, said first and said second main amplifying sections producing first and second main amplified signals having first and second phases, respectively; and a signal combining section, connected to said first and said second main amplifying sections, for combining the first main amplified signal with the second main amplified signal with the first phase shifted into the second phase, said signal combining section producing the combined signal.

3. A combining circuit as claimed in claim 2, wherein said first preliminary amplifying section comprises:

a first variable gain amplifier, connected to said first frequency converting section, for amplifying the first frequency-converted signal by a first variable gain, said first variable gain amplifier producing the first preliminary amplified signal;

a first automatic gain control (AGC) controller, connected to said first variable gain amplifier, for producing a first AGC voltage in accordance with the first output level so as to maintain the first output level at a predetermined level;

a first holding circuit, connected to said first variable gain amplifier, for holding a first input voltage as a first held voltage, said first holding circuit supplying the first held voltage to said first variable gain amplifier to control the first variable gain; and a first switch, connected between said first AGC controller and said first holding circuit, which is put into an on-state or an off-state under the control of the control circuit, said first switch switches the first AGC voltage to produce the first input voltage, said second preliminary amplifying section comprising:

a second variable gain amplifier, connected to said second frequency converting section, for amplifying the second frequency-converted signal by a second variable gain, said second variable gain amplifier producing the second preliminary amplified signal;

a second automatic gain control (AGC) controller, connected to said second variable gain amplifier, for producing a second AGC voltage in accordance with the second output level so as to maintain the second output level at the predetermined level;

a second holding circuit, connected to said second variable gain amplifier, for holding a second input voltage as a second held voltage, said second holding circuit supplying the second held voltage to said second variable gain amplifier to control the second variable gain; and a second switch, connected between said second AGC controller and said second holding circuit, which is put into an on-state or an off-state under the control of the control circuit, said second switch switches the second AGC voltage to produce the second input voltage.

4. A combining circuit as claimed in claim 3, wherein the control circuit controls said first and said second frequency converting sections with a disable condition where the first and the second received signals are not received but noises are received alone when a power supply is turned on, the control circuit controlling said first and said second switches with the on-state when the power supply is turned on, thereby supplying the first and the second AGC voltages as the first and the second input voltages to said first and said second holding circuits via said first and said second switches, respectively.

5. A combining circuit as claimed in claim 4, wherein the control circuit controls said first and said second switches with the off-state after the power supply is turned on, whereby said first and said second holding circuits hold, as the first and the second held voltages, the first and the second AGC voltages which said first and said second AGC controllers produce immediately before said first and said second switches are put into the off-state, subsequently, the control circuit controlling said first and said second frequency converting sections with an enable condition where the first and the second received signals are received.

* * * * *